United States Patent Office

2,874,160
PHARMACEUTICALS

Dominic D. Micucci, Havertown, Souren Avakian and Robert R. Brendel, Oreland, and Gustav J. Martin, Philadelphia, Pa., assignors to The National Drug Company, Philadelphia, Pa., a corporation of Delaware No Drawing. Application March 28, 1957
Serial No. 649,015

3 Claims. (Cl. 260—294)

This invention relates to and has for its object the provision of a novel series of chemical compounds and methods for their preparation, the compounds being useful as medicinals which affect the central nervous system and yield hypnotic or sedative effects. This application is a continuation-in-part of Serial No. 539,679, filed October 10, 1955, now abandoned, same inventors.

The compounds of the invention are those having the general formula

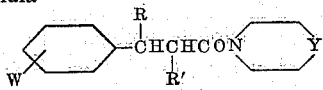

wherein W is a member of the group consisting of hydrogen, halogen (e. g. chlorine, bromine, iodine, fluorine), lower alkyl (e. g. methyl, ethyl, isopropyl, etc.), and lower alkoxy (e. g. methoxy, ethoxy, propoxy, etc.); R is a member of the group consisting of hydrogen and lower alkyl (e. g. methyl, ethyl, isopropyl, etc.); R' is a member of the group consisting of allyl, cyclopentyl, and cyclopentenyl; and Y is a member of the group consisting of methylene, oxygen and the bond forming a pyrrolidine ring and NH and NR" wherein R" is alkyl, alkenyl, aralkyl or carbalkoxy.

These compounds may be prepared by condensing the desired allyl, cyclopentyl or cyclopentenyl halide with a dialkyl malonate (or alkyl acetoacetate) in an anhydrous organic medium, such as alcohol or toluene, in the presence of equimolecular amounts of sodium, sodium alkoxide or sodium hydride condensing the resulting products with the desired alpha-phenylalkyl halide

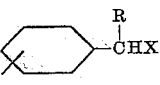

in a similar manner, hydrolyzing by refluxing in alcoholic KOH (or NaOH, etc.) to obtain the free acid, decarboxylating to obtain the substituted fatty acid and ultimately treating it with a halogenating agent such as $SOCl_2$ or $PCl_5$ to obtain the acid halide. The acid halide may then be treated with the desired amine to form the final product. If the amine is piperazine, the acid halide is treated in an anhydrous organic solvent medium with the 1-carbo lower alkoxy piperazine and the resulting product is decarbalkoxylated to form the secondary amine, then treated further with the appropriate hydrocarbon halide (preferably alkyl, especially lower alkyl halide) to form the tertiary amine. When the amine is piperidine or pyrrolidine, the free base is treated directly to obtain the desired product. This series of steps is graphically illustrated below (R, R', W, X and Y having the same meaning as above).

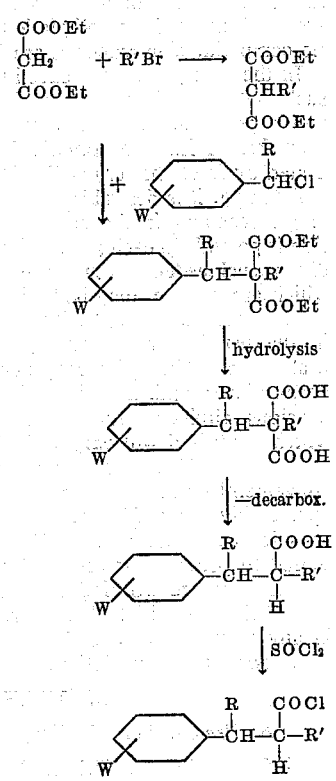

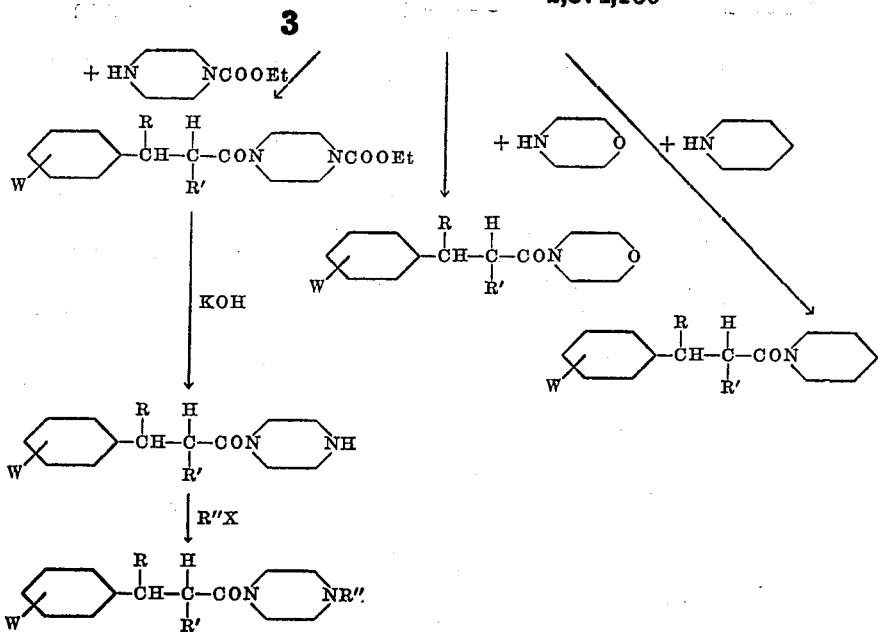

Where the R group in the alpha-phenylalkyl halide is other than hydrogen, the hydrocarbon halide (R'X) must be reacted with the dialkyl-malonate prior to the condensation with the alpha-phenylalkyl halide when the reaction is carried out in alcohol. In toluene, however, these alkylation steps may be carried out in either order. This is possible because, in toluene, for instance, MeOH formed from the reaction of NaOMe and alpha-phenylalkyl-malonic ester is distilled out, hence shifting the equilibrium:

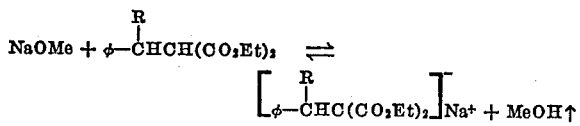

to the right eliminating the predominant R'X+NaOMe reaction. When sodium or sodium hydride and toluene are used, the order of alkylation is also immaterial since no competing side reactions are involved.

In the cases where the substituents in the molecule are such that the carbon atoms alpha and beta to the carboxamide group are both asymmetric centers and different, then there exists two isomeric dl pairs which may be separated by fractional crystallization.

Although it is desirable to use stoichiometric quantities of the reactants in the condensation, considerable variation is possible in each step. Likewise, other reaction conditions such as temperature, pressure and the inert solvents which are utilized, may be varied within wide limitations.

The compounds of the invention may be incorporated in the usual manner for ingestion, preferably by the oral route. Thus, the compounds may be tabletted or encapsulated; and, if desired, they may be made into suspensions, elixirs or other such liquid form. The dosage which is utilized will vary with the particular patient being treated. The dosage unit forms may, therefore, be conveniently made up to contain about 50–200 mg. (preferably about 50 mg.) per dosage unit, e. g. tablet, capsule, teaspoonful, etc. Tablets may, of course, be scored to provide for further fractional dosages.

Following are working examples presented as illustrative of the invention. However, these examples are not in any way limitative and cannot be construed as any restriction on the invention.

EXAMPLE 1

A. *Preparation of allyl-p-xylylacetylchloride*

Diethyl malonate, 62.5 g., is added to a well-stirred suspension of 22.2 g. NaOMe (95%) in 250 ml. dry toluene. Then 55.0 g. p-xylylchloride are added dropwise over a period of two hours. The reaction mixture is heated for an additional two hours, cooled, acidified with an hydrous HCl and filtered through a diatomaceous earth filteraid. The filtrate is distilled, and the diethyl p-xylylmalonate product thus recovered in the amount of 60 g. (B. P.$_{.0.5}$ 112–120° C.). This ester is then allylated in a similar manner using 200 ml. dry toluene, 13 g. NaOMe and 27.5 g. allyl bromide. (The MeOH formed is distilled from mixture.) Diethylallyl-p-xylylmalonate, B. P.$_{.0.3}$ 118–123° C., is obtained in a yeld of 59 g. This is hydrolyzed with 59 g. KOH, 90 ml. H$_2$O, and 59 ml. EtOH to obtain the diacid, which is then decarboxylated, treated with SOCl$_2$ and distilled. The allyl-p-xylylacetylchloride product, B. P.$_{.0.3}$ 89–91° C., amounts to 26.5 g.

B. *1-[allyl-p-xylylacetyl]-piperidine*

A solution of 24 g. allyl-p-xylylacetyl chloride in 50 ml. anhydrous ethyl ether is added dropwise to a stirred solution of 18 g. piperidine in 200 ml. anhydrous ethyl ether. The reaction mixture is stirred for 2 hours, allowed to stand over night and then filtered. The filtrate is washed several times with water, dried over anhydrous Na$_2$SO$_4$ and distilled to obtain the desired amide (B. P.$_{.0.3}$ 160–162° C.).

B'. *1-[allyl-p-xylylacetyl]-morpholine*

Following the procedure of Example 1–B except that an equivalent amount of morpholine is substituted for the piperidine used in the reference examples, and the corresponding amide (B. P.$_{.0.2}$ 165–167° C.) is obtained.

B''. *1-[allyl-p-xylylacetyl]-piperazines*

*1-acyl-4-carbethoxypiperazine.*—A solution of 24 g. allyl-p-xylylacetylchloride in 50 ml. anhydrous ethyl ether is added dropwise to a well stirred, refluxing mixture of 14.5 g. 1-carbethoxypiperazine and 11 g. anhydrous sodium carbonate in 200 ml. anhydrous ethyl ether. After six hours of refluxing, the mixture is treated with 50 ml. H$_2$O and stirred for two hours. The ether layer is decanted, then dried over anhydrous MgSO$_4$. The viscous oils are purified by distilling in vacuo to obtain the desired product.

*1-acylpiperazine.*—The 1-acyl-4-carbethoxypiperazine is refluxed for 24 hours in ethanolic potassium hydroxide to remove the carbethoxy group. The ethanol is separated by reduced pressure distillation. Water is then added with stirring to the residue until all the solid material has dissolved. The resulting mixture is extracted several times with ethyl ether. The ether extracts are combined, dried over anhydrous $MgSO_4$ and distilled. The viscous 1-acyl-piperazines which are obtained are purified by distilling in vacuo.

*1-acyl-4-alkylpiperazine.*—With the exception of 1-acyl-4-methylpiperazines, these compounds are prepared as follows: A solution of 0.05 mol (e. g. 3.2 ethylchloride; 3.9 propylchloride, etc.) of the appropriate alkyl halide in 25 ml. anhydrous ethyl ether is added dropwise to a well-stirred, refluxing mixture of 0.1 mol 1-acylpiperazine and 0.1 mol anhydrous $Na_2CO_3$ in 100 ml. anhydrous ether. After 24 hours of refluxing, the mixture is treated with 10 ml. $H_2O$ and stirred for an additional 4 hours. The ethyl ether is separated from the salts by decanting, and then dried over anhydrous $MgSO_4$. After separating the ether by distillation, pure compounds are obtained by distillation in vacuo.

*1-acyl-4-methylpiperazine.*—Methylation of 1-acylpiperazine with formic acid and formaldehyde by the method of Clarke and co-workers (J. Am. Chem. Soc. 55, 4571, 1933), yields the 1-acyl-4-methylpiperazine.

EXAMPLE 2

A. *Preparation of allylbenzylacetylchloride*

Sodium, 11.5 g., is added in small pieces with stirring to 250 ml. absolute ethanol. Then 80.0 g. of ethyl malonate is added slowly to the sodium in alcohol solution. After one hour the reaction solution is heated to reflux and then 60.5 g. allyl bromide is added dropwise during the course of two hours. The stirring and refluxing is continued for two hours longer. Most of the alcohol is distilled from the reaction mixture and 125 ml. $H_2O$ is added to the cooled residue. The ester layer is separated and the water layer is extracted with 6 x 20 ml. portions of ether. The ester and ether extracts are combined, dried over anhydrous $Na_2SO_4$, and distilled. The fraction B. P.$_{30}$ 117–125° C. is collected and weighs 81 g.

The benzyl group is introduced into the molecule in similar manner using 28.0 g. diethylallylmalonate, 3.2 g. sodium, 80 ml. absolute EtOH and 17.8 g. benzyl chloride. This product, B. P.$_{0.5}$ 108–116° C.

The ester is then hydrolyzed, decarboxylated, treated with $SOCl_2$ to give the acid chloride intermediate, having a B. P.$_{0.5}$ of 78–82° C.

B. *1-allylbenzylacetyl-piperidine*
B'. *1-allylbenzylacetyl-morpholine*
B". *1-allylbenzylacetyl-piperazines*

Following the procedure of Example 1–B, B' and B" except that a corresponding amount of allyl-p-fluorobenzylacetylchloride is substituted for the allyl-p-xylylacetylchloride of the reference example, the corresponding acetamides are obtained.

EXAMPLE 3

A. *Preparation of allyl-p-fluorobenzylacetylchloride*

Following the procedure of 2–A except that an equivalent amount of p-fluorobenzylchloride is substituted for the benzylchloride of the reference example, the allyl-p-fluorobenzylchloride is obtained (B. P. 108–109° C./1.0 mm.). The p-fluorobenzylchloride which is used may be prepared by refluxing for 7 hours, a mixture of 0.68 mol p-fluorotoluene, 1.1 mols furfuryl chloride, and 1 g. benzyl peroxide.

B. *1-[allyl-p-fluorobenzylacetyl]-piperidine*
B'. *1-[allyl-p-fluorobenzylacetyl]-morpholine*
B". *1-[allyl-p-fluorobenzylacetyl]-piperazine*

Following the procedure of Example 2–B except that an equivalent amount of p-fluorobenzylchloride, prepared by refluxing for 7 hours, then distilling in vacuo, a mixture of 0.68 mol p-fluorotoluene, 1.1 mols sulfuryl chloride and 1 g. benzyl peroxide, is substituted for benzyl chloride, the corresponding acid chloride (B. P. 108–109° C./1.0 mm.) was obtained. This acid chloride is substituted for allyl-p-xylylacetylchloride in Example 1–B' and corresponding 1-(allyl-p-fluorobenzylacetyl) morpholine (B. P. 153–154° C./0.7 mm.) was obtained.

EXAMPLE 4

A. *Preparation of allyl-α-phenylethylacetylchloride*

Diethyl allyl-α-phenylethylmalonate intermediate is prepared in two ways, in an alcohol medium, just as described above, and in a toluene medium. In the alcohol method it is necessary to introduce the allyl group into the molecule first. The α-phenylethyl group is then introduced in similar manner. The alkylation of 50.0 g. diethylallylmalonate with 46.3 g. α-phenylethyl bromide, 5.75 g. Na and 125 ml. EtOH yields 60 g. of diethylallyl-α-phenylethylmalonate, B. P.$_{0.5}$ 115–120° C.

In the toluene method it is found that by distilling the alcohol formed from the reaction mixture, the groups could be introduced in either order. Diethyl-α-phenylethylmalonate, 52.8 g. is added with stirring to a suspension of 10.8 g. 95% NaOMe in 470 ml. dry toluene. The MeOH formed is removed by distilling through a short Vigreux column. The column is replaced with a condenser and 15.3 g. allylchloride is added dropwise over a period of two hours and the mixture refluxed for four hours. The reaction mixture is washed with water and stripped of toluene at diminished pressures. The yield of diethyl allyl-α-phenylethylmalonate intermediate, B. P.$_{0.3}$ 115–121° C., $n_D^{23}$ 1.5002, amounts to 42 g. (70 percent theoretical).

The diethyl allyl-α-phenylethylmalonate is also prepared by reacting 150 g. diethylallylmalonate with 42 g. 95% NaOMe suspended in 400 ml. dry toluene. The alcohol formed is distilled from the reaction mixture, which is then heated to reflux and 140 g. α-phenylethyl bromide added dropwise with stirring over a period of two hours. The mixture is heated and stirred for an additional two hours, filtered through a diatomaceous earth filteraid to remove NaBr and stripped of toluene under diminished pressures. The product, B. P.$_{0.3}$ 120–123° C., $n_D^{23}$ 1.5020, amounts to 144 g.

A mixture of 60 g. diethyl allyl-α-phenylethylmalonate intermediate and a solution of 48 g. KOH (85%), 102 ml. EtOH and 48 ml. $H_2O$ is refluxed for twenty-four hours. Most of the alcohol is removed by distilling on a steam bath under slightly diminished pressures. The residue is cooled, treated with 150 ml. $H_2O$ to dissolve the acid salt, and the resulting solution made strongly acid with concentrated hydrochloric acid. The oil product 48 g. of crude allyl-α-phenylethylmalonic acid, is decarboxylated by heating in an oil bath maintained at 160–180° C. for six hours. Thionyl chloride (48 ml.) is added to the resulting acetic acid derivative and the solution heated on a steam bath for two hours and distilled. The acid chloride intermediate can then be used for further condensation.

B. *1-[allyl-α-phenylethylacetyl]-piperidine*
B'. *1-[allyl-α-phenylethylacetyl]-morpholine*
B". *1-[allyl-α-phenylethylacetyl]-piperazines*

Following the procedure of Example 1–B, B' and B" except that a corresponding amount of allyl-α-phenylacetylchloride is substituted for the allyl-p-xylylacetylchloride of the reference example, the corresponding acetamides are obtained.

EXAMPLE 5

Following the procedure of Example 2–A, B, B' and B", except that the corresponding amount of p-methoxybenzyl bromide is substituted for the benzylchloride of the reference example, the analogous products are obtained.

EXAMPLE 6

Following the procedure of Example 1–A and B, except that the corresponding amount of p-fluorobenzyl-bromide and morpholine is substituted for the p-xylyl-chloride and piperidine of the reference example, the compound 1-[allyl-p-fluorobenzylacetyl]-morpholine (B. P.$_{0.7}$ 153–154° C.) is obtained.

EXAMPLE 7

Following the procedure of Example 1–A and B, except that the corresponding amount of p-fluorobenzyl-bromide and pyrrolidine is substituted for the p-xylyl-chloride and piperidine of the reference example, the compound 1-[allyl-p-fluorobenzylacetyl]-pyrrolidine (B. P.$_{0.65}$ 140–142° C.) is obtained.

EXAMPLES 8–17

Following the procedures of the examples above, compounds of the formula

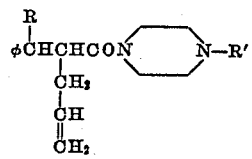

are prepared wherein:

| Example | R | R' | B. P. of base/mm. | M. P. of HCl, degrees |
|---|---|---|---|---|
| 4 | H | H | 151–152°/0.1 | 121–122 |
| 5 | H | CH$_3$— | 138–140°/0.1 | |
| 6 | H | CH$_2$=CHCH$_2$— | | 154–155 |
| 7 | H | CH≡CCH$_2$— | | 178–179 |
| 8 | H | φCH$_2$— | | 169–170 |
| 9 | H | C$_2$H$_5$CO$_2$— | 191–194°/0.1 | |
| 10 | CH$_3$ | H | 153–155°/0.1 | |
| 11 | CH$_3$ | CH$_2$=CHCH$_2$— | 155–158°/0.1 | |
| 12 | CH$_3$ | φCH$_3$— | 194–196°/0.8 | |
| 13 | CH$_3$ | C$_2$H$_5$CO$_2$— | 197–198°/0.1 | |

As has been indicated above, the compounds of the invention may be used as medicinals after compounding in the ordinary manner to form tablets, capsules, elixirs, or any other of the standard dosage unit forms. Following are examples showing the preparation of specific dosage unit forms with the compound 1-[allyl-p-xylyl-acetyl]-piperidine taken as the exemplary acetamide.

EXAMPLE 18.—TABLETS

| Ingredient: | Gm. |
|---|---|
| Allyl-p-xylylacetyl-piperidine | 0.30 |
| Starch | 0.06 |
| Talc | 0.018 |
| Carboxymethyl cellulose 1%, q. s. | |

The acetamide and the starch are put through an 80 mesh screen on the Fitzpatrick-Homoloid machine. They are then thoroughly mixed and the carboxymethylcellulose solution is slowly added while mixing continues. The resulting material is then dried at 60° C., granulated, and returned to the mixer. It is finally screened on talc, then compressed in the usual way.

EXAMPLE 19.—ELIXIR

Ingredient:
| | | |
|---|---|---|
| Allyl-p-xylylacetyl-piperidine | gms | 20 |
| Ethyl alcohol, U. S. P. | ml | 150 |
| Glycerin | ml | 350 |
| Distilled water, q. s. | ml | 1000 |

The acetamide is dissolved in the alcohol and the glycerin is added. The mixture is then made to volume with distilled water and filtered.

This invention may be variously otherwise embodied within the scope of the appended claims.

We claim:

1. A compound of the general formula

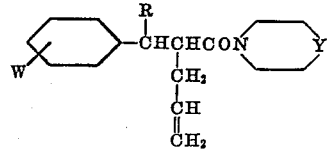

wherein W is a member of the group consisting of hydrogen, halogen, lower alkoxy, and lower alkyl; R is a member of the group consisting of hydrogen and methyl; and Y is a member of the group consisting of methylene, oxygen, and the bond forming a pyrrolidine ring.

2. 1-(allylbenzylacetyl) piperidine.

3. 1-(allyl-p-fluorobenzylacetyl) piperidine.

References Cited in the file of this patent

UNITED STATES PATENTS 2,717,896     Goldman     Sept. 13, 1955

FOREIGN PATENTS 499,298     Canada     Jan. 19, 1954
712,343     Great Britain     July 21, 1954

OTHER REFERENCES

Ramart: "Annales de Chemie," vol. 8, series 10 (1927), pp. 268 and 272.

Zaug et al.: J. A. C. S., vol. 72, 1950, p. 3005.

Stedman's Medical Dictionary Illustrated, seventeeth revised edition, The Williams and Wilkins Co., Baltimore, 1949.